(12) United States Patent  
Kishi (10) Patent No.: US 7,387,435 B2  
(45) Date of Patent: Jun. 17, 2008

(54) TEMPERATURE SENSOR

(75) Inventor: Masakazu Kishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/992,809

(22) Filed: Nov. 22, 2004

(65) Prior Publication Data

US 2005/0089080 A1  Apr. 28, 2005

Related U.S. Application Data

(63) Continuation of application No. 10/157,123, filed on May 30, 2002, now abandoned, which is a continuation of application No. PCT/JP99/06946, filed on Dec. 10, 1999.

(51) Int. Cl.  
*G01K 11/26* (2006.01)

(52) U.S. Cl. ...................................... 374/117

(58) Field of Classification Search ......... 374/117–119  
See application file for complete search history.

(56) References Cited

U.S. PATENT DOCUMENTS

| | | | |
|---|---|---|---|
| 4,102,195 A | 7/1978 | Thompson et al. | 73/340 |
| 4,210,024 A | 7/1980 | Ishiwatari et al. | 73/362.5 |
| 4,249,418 A | 2/1981 | Ebata | 73/339 A |
| 4,398,115 A | 8/1983 | Gagnepain et al. | 310/313 A |
| 4,415,870 A * | 11/1983 | Zumsteg | 331/176 |
| 4,437,773 A | 3/1984 | Dinger et al. | 374/117 |
| 4,468,634 A | 8/1984 | Takagi et al. | 331/60 |
| 4,537,515 A * | 8/1985 | Dinger et al. | 331/176 |
| 4,551,031 A | 11/1985 | Ishikawa et al. | 374/117 |
| 4,558,248 A | 12/1985 | Valentin | 310/315 |
| 5,214,668 A | 5/1993 | Satou et al. | 374/117 |
| 5,231,880 A | 8/1993 | Ward et al. | 73/702 |
| 5,235,844 A | 8/1993 | Bonne et al. | 73/24.01 |
| 5,498,920 A * | 3/1996 | Okano et al. | 310/313 A |
| 5,546,810 A * | 8/1996 | Arikawa et al. | 73/702 |
| 5,591,945 A * | 1/1997 | Kent | 178/18.04 |
| 5,638,418 A | 6/1997 | Douglass et al. | 377/25 |
| 5,739,416 A | 4/1998 | Hoenk | 73/29.01 |
| 5,774,425 A | 6/1998 | Ivanov et al. | 368/11 |
| 5,836,691 A | 11/1998 | Yamauchi | 374/117 |
| 5,899,570 A | 5/1999 | Darmawaskita et al. | 374/170 |
| 5,912,602 A * | 6/1999 | Takagi et al. | 333/193 |

(Continued)

FOREIGN PATENT DOCUMENTS

CH   669 668 A5   3/1989

(Continued)

*Primary Examiner*—Gail Verbitsky  
*Assistant Examiner*—Mirellys Jagan  
(74) *Attorney, Agent, or Firm*—Kratz, Quintos & Hanson, LLP (57) ABSTRACT

In a temperature sensor, especially in a temperature sensor using a resonator, based on a frequency of one oscillator circuit (resonator), frequencies of the other one or more oscillator circuits (resonators) are measured, and frequency-temperature characteristics of a plurality of resonators are synthesized in order to realize an accurate temperature sensor which does not require an accurate frequency reference regardless of a temperature change, and has a linear characteristic and a wide measurable temperature range. Also, two oscillator circuits have two resonators respectively with quadratic characteristics in which quadratic coefficients are the same and linear characteristics are different from each other, and a difference between oscillation frequencies of both oscillator circuits is obtained.

1 Claim, 11 Drawing Sheets

U.S. PATENT DOCUMENTS

| | | | |
|---|---|---|---|
| 6,208,063 B1 * | 3/2001 | Horikawa et al. | 310/313 R |
| 6,218,763 B1 * | 4/2001 | Fujimoto et al. | 310/313 R |
| 6,700,449 B2 * | 3/2004 | Ichimaru | 331/107 A |

FOREIGN PATENT DOCUMENTS

| | | | |
|---|---|---|---|
| JP | 54138480 A * | 10/1979 | |
| JP | 58-155321 | 9/1983 | |
| JP | 59-32834 | 2/1984 | |
| JP | 59128422 A * | 7/1984 | |
| JP | 61082130 A * | 4/1986 | |
| JP | 63-284439 | 11/1988 | |
| JP | 02057928 A * | 2/1990 | |
| JP | 02149106 A * | 6/1990 | |
| JP | 4-363913 | 12/1992 | |
| JP | 6-11492 | 1/1994 | |
| JP | 9-307355 | 11/1997 | |
| JP | 11-2571 | 1/1999 | |
| JP | 2000124736 A * | 4/2000 | |
| JP | 2001274625 A * | 10/2001 | |
| JP | 2002-26769 | 1/2002 | |

\* cited by examiner

TEMPERATURE SENSOR

This application is a Continuation application of U.S. patent application Ser. No. 10/157,123, filed May 30, 2002 now abandoned, which is a Continuation of International application PCT/JP99/06946 filed Dec. 10, 1999.

BACKGROUND OF THE INVENTION

1. Field of the Invention

The present invention relates to a temperature sensor, and in particular to a temperature sensor using a resonator.

Various temperature sensors have been proposed depending on the applications thereof and have been reduced to practice. For any temperature sensor, a temperature reproducibility, a temperature range, a temperature characteristic, and an accuracy required for the applications are important.

2. Description of the Related Art

Figure 17:
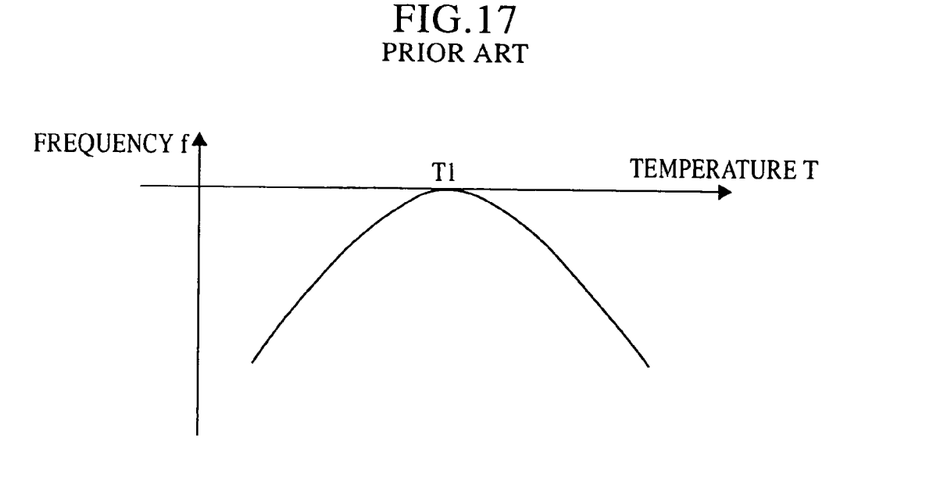
FIG. 17 is a graph showing a frequency-temperature characteristic example of a general SAW resonator used in a temperature sensor.

FIG. 17 shows a frequency-temperature characteristic of a Surface Acoustic Wave (hereinafter, abbreviated as SAW) resonator receiving attention in various fields for its superior temperature reproducibility. This characteristic is shown by a quadratic curve in which a frequency "f" exhibits a maximum value (peak) at a temperature T1.

Figure 18:
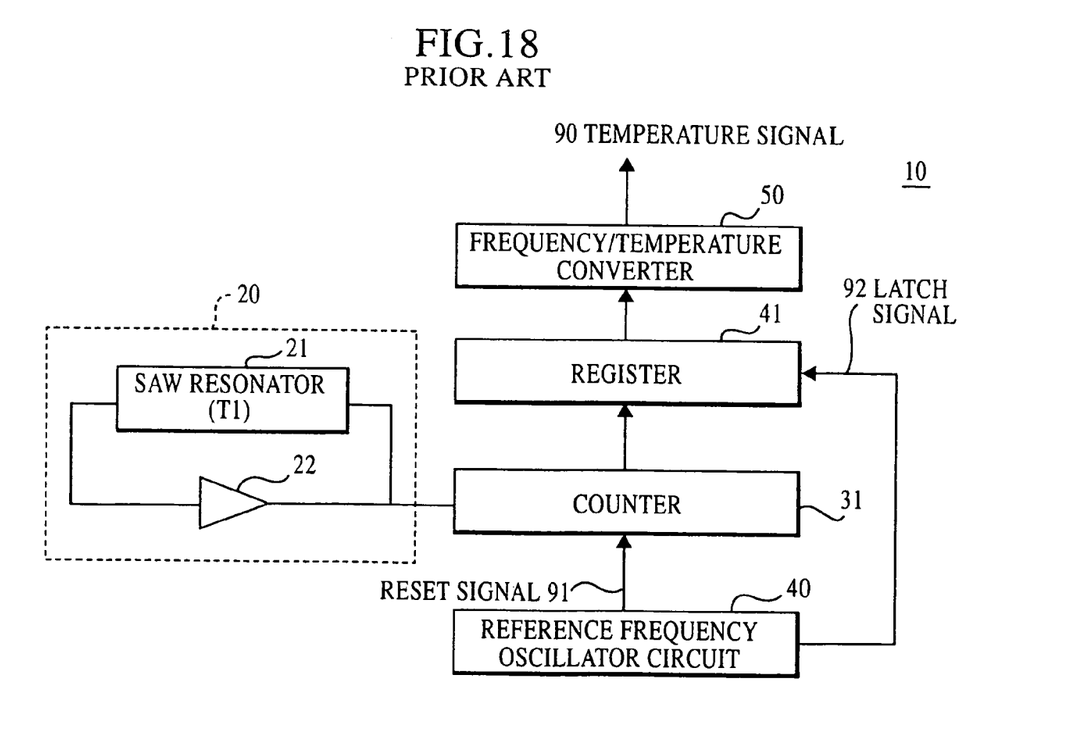
FIG. 18 is a block diagram showing an arrangement of a prior art temperature sensor.

FIG. 18 shows a prior art arrangement of a temperature sensor using a SAW resonator. In this example, an oscillator circuit 20 is arranged so as to connect a SAW resonator 21 as an oscillator to an amplifier 22 and a temperature sensor 10 measuring the oscillation frequency of the oscillator circuit 20 by a reference frequency is composed.

A counter 31 counts an output of the oscillator circuit 20. A reference frequency oscillator circuit 40 produces a latch signal 92 for latching, in a register 41, a value of the counter 31 at a fixed time interval (e.g. 1 sec.) based on an internal reference frequency, and a reset signal 91 provided to the counter 31 after the latching.

A frequency/temperature converter 50 includes a table storing a relationship between the frequency "f" and the temperature "T" shown in FIG. 17 preliminarily obtained by experiments or the like, and outputs, referring to this table, a temperature signal 90 obtained by converting a frequency value from the register 41 into a temperature value.

In such a temperature sensor 10, an accurate frequency reference signal corresponding to a required temperature accuracy becomes necessary, so that the circuit price is increased as the accuracy increases.

As for a measurable temperature range at this time, it is supposed that either a temperature range higher than a temperature T1 or a temperature range lower than the temperature T1 is preliminarily selected lest two temperatures correspond to the same frequency. Also, since a gradient around the temperature T1 is small, the temperature greatly changes even for a little frequency change and the measurement accuracy declines. For this reason, it is common to remove the range around the temperature T1 from available ranges.

Namely, when the frequency-temperature characteristic is a quadratic curve, a cubic curve, or more, there is a possibility that two or more temperatures correspond to the same frequency. Therefore, the measurable temperature range is disadvantageously limited by the frequency-temperature characteristic of the SAW resonator.

It is to be noted that the above-mentioned problems are common to the temperature sensors using not only the SAW resonator but also a general oscillator.

SUMMARY OF THE INVENTION

It is accordingly an object of the present invention to provide a temperature sensor not requiring an accurate frequency reference regardless of a temperature change.

It is another object to provide a temperature sensor with a wide measurable temperature range.

It is a further object to provide an accurate temperature sensor having a linear characteristic.

(1) In order to achieve the above-mentioned objects, a temperature sensor according to the present invention comprises: two oscillator circuits using resonators having different temperature characteristics of resonance frequencies; and a detection circuit for relatively obtaining, with a frequency of one oscillator circuit being made a reference, a frequency of the other oscillator circuit, for performing a predetermined calculation between both frequencies, and for outputting a calculation result as a temperature signal.

Namely, a temperature characteristic of a resonance frequency of a resonator used for one oscillator circuit is different from that of a resonator used for the other oscillator circuit. With an output frequency, which may depend on a temperature, of one oscillator circuit being made a reference, a detection circuit relatively measures an output frequency, which may also depend on a temperature, of the other oscillator circuit.

Then, a predetermined calculation is performed to both output frequencies, so that the result is outputted as a temperature signal corresponding to an actual temperature. It is to be noted that the relationship between the temperature signal and the actual temperature can be easily obtained by a well-known relationship.

Thus, even if the oscillation frequencies may depend on a temperature, since one oscillation frequency is relatively measured from the other oscillation frequency, it becomes possible to realize a temperature sensor having a temperature characteristic which can not be realized by a single resonator, without a conventional absolute frequency reference with a high accuracy.

In other words, it becomes possible to realize a temperature sensor which outputs a desired temperature signal by selecting the frequency-temperature characteristics of two oscillator circuits.

It is needless to say that a delay-type oscillator circuit using a resonator may be included in the above-mentioned oscillator circuit.

(2) Also, in the present invention according to the above-mentioned present invention (1), the detection circuit may comprise a reference counter for counting a predetermined time interval based on a frequency of one oscillator circuit, a temperature counter for counting an output of the other oscillator circuit during the predetermined time interval, and a calculating circuit for calculating a difference between values of the temperature counter and the reference counter.

Namely, the reference counter counts the predetermined time interval, which may depend on a temperature, by inputting an output frequency signal of one oscillator circuit and by counting until a predetermined counter value is reached.

The temperature counter can obtain a counter value corresponding to the oscillation frequency by counting an output of the other oscillator circuit at the predetermined time intervals. The calculating circuit obtains a difference between the predetermined counter value and the counter value of the temperature counter to be outputted as a temperature signal corresponding to the temperature.

It is to be noted that in order to obtain an actual temperature from this temperature signal, a relationship has only to be used between the temperature signal and the temperature preliminarily obtained based on e.g. the frequency-temperature characteristics in two oscillator circuits, and a calculating equation of a calculating circuit=difference.

Thus, by obtaining the difference between the counter values of both counters, it becomes unnecessary to use the absolute oscillator circuit with a high accuracy that is stable for the temperature and it becomes possible to realize a temperature sensor outputting a desired temperature signal.

(3) Also, in the present invention according to the above-mentioned present invention (1), the detection circuit may comprise a reference counter for counting a predetermined time interval based on a frequency of one oscillator circuit, a temperature counter for counting an output of the other oscillator circuit during the predetermined time interval, and a calculating circuit for calculating a ratio between values of the temperature counter and the reference counter.

Namely, the operations of the reference counter and the temperature counter are the same as those in the above-mentioned present invention (2). The calculating circuit, different from the present invention (2), obtains a ratio between the counter values of the temperature counter and the reference counter to be outputted as a value corresponding to the temperature.

Thus, by obtaining the ratio between the counter values of both counters, it becomes unnecessary to use the absolute oscillator circuit with a high accuracy, and it becomes possible to realize a temperature sensor having a desired relationship between a temperature signal and a temperature.

(4) Also, in the above-mentioned present invention (1), the temperature sensor according to the present invention may further comprise one or more oscillator circuits using another resonator having a different temperature characteristic of a resonance frequency, and the detection circuit may obtain, with a frequency of a first oscillator circuit among the oscillator circuits being made a reference, frequencies of the remaining two or more second oscillator circuits, perform a predetermined calculation between all the frequencies, and output a calculation result as a temperature signal.

Namely, by using the resonators, three or more oscillator circuits are composed. The temperature characteristics of the resonance frequencies of the resonators used for the oscillator circuits are different from each other. The detection circuit relatively measures, with an output frequency of one oscillator circuit among them being made a reference, the respective frequencies of the remaining two or more oscillator circuits.

Based on all of the frequencies obtained, a predetermined calculation is performed, so that the calculation result is outputted as a temperature signal. From this temperature signal, an actual temperature is recognized.

Thus, it becomes possible to realize a temperature sensor having the frequency-temperature characteristic in which the frequency-temperature characteristics of three or more resonators are synthesized, so that the frequency-temperature characteristic synthesized by e.g. two resonators can be corrected to a further preferable characteristic.

(5) Also, in the present invention according to the above-mentioned present invention (4), the detection circuit may include a reference counter for counting a predetermined time interval based on a frequency of the first oscillator circuit, a total counter for totalizing outputs of the remaining oscillator circuits either in an up direction or a down direction during the predetermined time interval to be counted, and a calculating circuit for calculating a difference between values of the total counter and the reference counter.

Namely, the reference counter counts the output of the first oscillator circuit, and makes the time until the counter becomes a predetermined counter value the predetermined time interval. The total counter inputs the frequency output signal of the other oscillator circuits at the predetermined time interval, and counts the signal in an up direction or a down direction, so that the result is outputted as a total counter value.

The calculating circuit outputs the difference between the counter values of the total counter and the reference counter as a temperature signal.

Thus, a temperature is measured by a single desired frequency-temperature characteristic obtained from the frequency-temperature characteristics of three or more oscillator circuits. It becomes possible to correct the frequency-temperature characteristic close to a straight line obtained by calculating the frequency-temperature characteristics of e.g. two oscillator circuits to the frequency-temperature characteristic of a complete straight line by further adding the temperature characteristics of the remaining oscillator circuits to the calculation.

(6) Also, in the present invention according to the above-mentioned present invention (4), the detection circuit may include a reference counter for counting a predetermined time interval based on a frequency of the first oscillator circuit, a total counter for totalizing outputs of the remaining oscillator circuits either in an up direction or a down direction during the predetermined time interval to be counted, and a calculating circuit for calculating a ratio between values of the total counter and the reference counter.

Namely, the operations of the reference counter and the total counter are the same as those in the present invention (5). However, the calculating circuit calculates not the difference between both counter values but the ratio between both counter values, and outputs the calculation result as a temperature signal corresponding to a temperature.

Thus, by obtaining the ratio, it becomes possible to obtain a temperature signal corresponding to a temperature based on the frequency-temperature characteristic obtained from the frequency-temperature characteristics of three or more oscillator circuits.

(7) Also, a temperature sensor according to the present invention comprises: two oscillator circuits having two resonators respectively with quadratic characteristics in which quadratic coefficients are same and linear characteristics are different from each other; and a detection circuit for detecting a difference between a frequency of one oscillator circuit and a frequency of the other oscillator circuit and for detecting a temperature corresponding to the difference.

Figure 1:
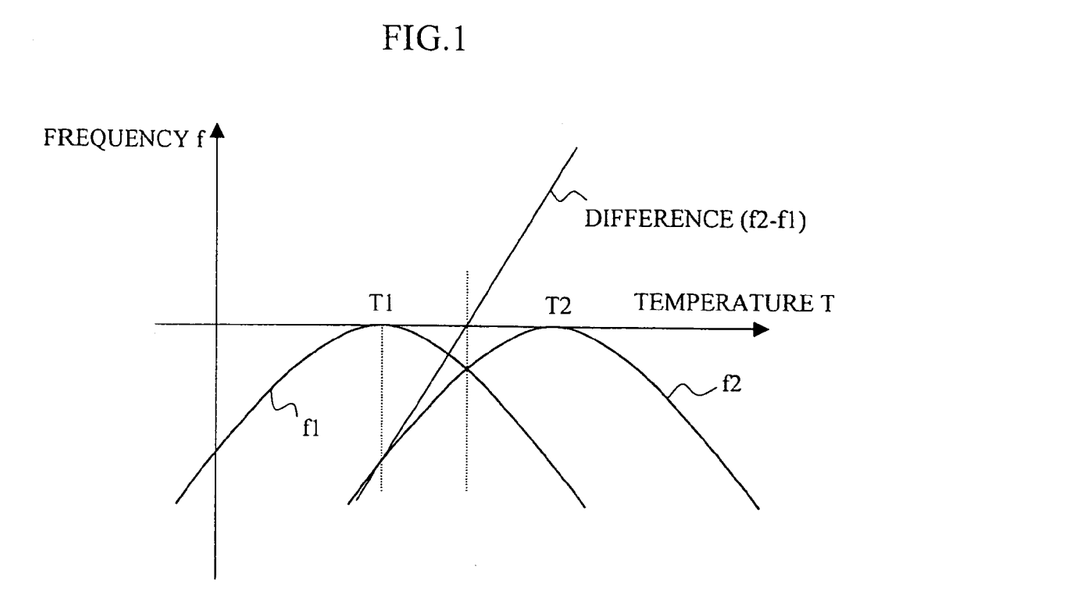
FIG. 1 is a graph showing frequency-temperature characteristics of two SAW resonators used in a temperature sensor according to the present invention, and a frequency-temperature characteristic example of a linear function obtained by synthesizing the frequency-temperature characteristics.

FIG. 1 shows characteristic curves of two resonators whose frequency-temperature characteristics are different from each other. These characteristic curves are expressed in the form of equations: $f1=a1(T-T1)^2+c1$, $f2=a2(T-T2)^2+c2$, where a quadratic coefficient is supposed to be $a1=a2$. The detection circuit inputs frequency output signals of the f1 and f2 respectively from the oscillator circuits to detect the difference. Supposing that $a1=a2=a$, the difference assumes a linear equation as follows:

$$\text{Difference} = f2 - f1 = 2a(T1-T2)T + a(T2^2 - T1^2) + c2 - c1 \qquad \text{Eq. (1)}$$

Thus, the temperature sensor outputs the value having a relationship of a linear function with a temperature. This output value can be easily converted into a temperature only from e.g. a linear coefficient of the linear function and a constant.

It is to be noted that a case of c1=c2 is shown in FIG. 1.

Accordingly, the difference (f2−f1) is expressed by the following equation:

$$\text{Difference} = f2 - f1 = 2a(T1-T2)(T-(T1+T2)/2) \quad \text{Eq. (2)}$$

Namely, the difference (=f2−f1) assumes a linear line passing through a midpoint between T1 and T2 on a temperature (T) axis.

While an absolute reference frequency with a high accuracy is required in this invention, both sides of the characteristic curves f1 and f2 can be used for the temperature measurable range, which leads to a wider temperature measurable range in comparison with the case shown in FIG. 17.

(8) Also, in the present invention according to the above-mentioned present invention (1), the detection circuit may multiply or divide a frequency of at least one oscillator circuit.

Namely, the detection circuit can change the frequency of the oscillator circuit to a frequency multiplied or divided. Thus, it becomes possible to change the frequency observed from the side of the detection circuit, i.e. to convert the frequency-temperature characteristic of the resonator, and the calculation of the temperature signal having a predetermined temperature characteristic becomes easy, thereby enabling the arrangement of the detection circuit to be simplified.

Also, it is possible to bring the frequencies of two oscillator circuits close until a beat arises.

(9) Also, in the present invention according to the above-mentioned present inventions (1) and (7), the detection circuit may convert the temperature signal into a predetermined temperature value.

Thus, it becomes possible to correct the temperature signal into the actual temperature value.

(10) Also, in the present invention according to the above-mentioned present inventions (4) and (7), an SAW resonator may be used as the resonator.

Namely, an SAW resonator superior in the temperature reproduction characteristic can be used as a resonator.

(11) Also, in the present invention according to the above-mentioned present invention (10), the SAW resonator may be formed on a same substrate.

Thus, in comparison with the case where the SAW resonators are discrete, variations of the temperature characteristics and variations of the detected temperatures due to a difference of detected positions can be avoided. Also, it becomes possible to make a temperature detection accurate, and to downsize a body of a resonator.

(12) Also, in the present invention according to the above-mentioned present invention (11), a propagation direction of one SAW resonator may be angled with respect to a propagation direction of the other resonator.

Thus, it becomes possible to make a coating thickness of electrodes same, and to make a production process simple.

(13) Also, in the present invention according to the above-mentioned present invention (10), at least one SAW resonator may utilize a Rayleigh wave, and at least another SAW resonator may utilize an SH wave.

(14) Also, in the present invention according to the above-mentioned present invention (10), the oscillator circuit may have a separator for separating a Rayleigh wave from an SH wave of one SAW resonator, a mixer for mixing the separated Rayleigh wave and the SH wave, and two oscillation portions for respectively oscillating with frequencies of the Rayleigh wave and the SH wave.

Namely, a separator separates a Rayleigh wave from an SH wave included in a single SAW resonator to be respectively provided to oscillation portions. The oscillation portions respectively oscillate with frequencies of the Rayleigh wave and the SH wave, so that the output is provided to a mixer. The mixer mixes both waves to be provided to the SAW resonator.

Thus, it becomes possible to use two frequencies in a single SAW resonator, and to make the SAW resonator downsized and highly accurate.

(15) Also, in the present invention, a Voltage Controlled Temperature Compensated Crystal Oscillator (VCTCXO) device may be realized by using a temperature sensor according to the above-mentioned present invention (1).

Namely, it is possible to control a Voltage Controlled Oscillator (VCO) portion of a VCTCXO device with the output of the temperature sensor being made temperature information.

(16) Also, in the present invention according to the above-mentioned present invention (15), an oscillator of a VCO portion and a resonator of the temperature sensor in the VCTCXO device may be formed in one piece on a same substrate.

Thus, it becomes possible to make the VCTCXO device downsized and highly accurate.

BRIEF DESCRIPTION OF THE DRAWINGS

The above and other objects and advantages of the invention will be apparent upon consideration of the following detailed description, taken in conjunction with the accompanying drawings, in which the reference numbers refer to like parts throughout and in which.

DESCRIPTION OF THE EMBODIMENTS

Figure 2:
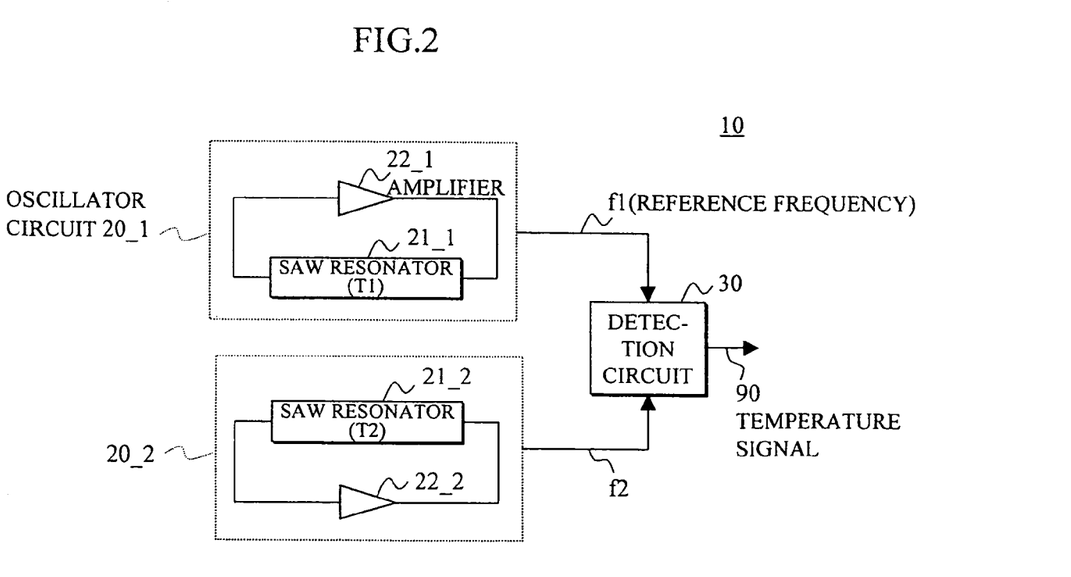
FIG. 2 is a block diagram showing an embodiment (1) of a temperature sensor according to the present invention.

FIG. 2 shows an embodiment (1) of a temperature sensor 10 according to the present invention. In this embodiment, oscillator circuits 20_1 and 20_2 respectively provide output frequency signals f1 and f2 to a detection circuit 30. Either the signal f1 or f2 (the signal f1 in this example) is made a reference frequency. The detection circuit 30 detects the frequency of the frequency signal f2 based on the reference frequency signal f1 to output a temperature signal 90.

The oscillator circuits 20_1 and 20_2, where SAW resonators 21_1 and 21_2 (occasionally represented by a reference numeral 21) are simply connected to amplifiers 22_1 and 22_2 like a loop respectively, are loop oscillator circuits.

As is well-known, any oscillator circuit among various prior art oscillator circuits may be used for the circuits 20.

Figure 3:
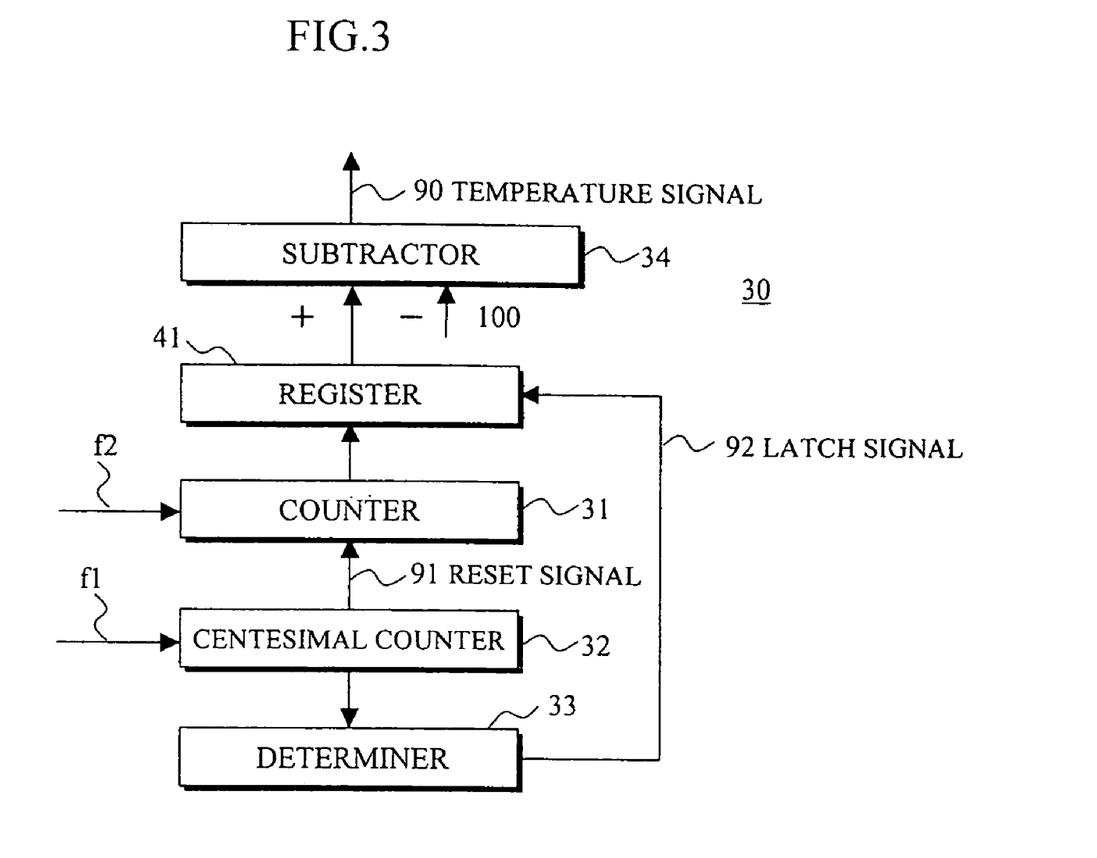
FIG. 3 is a block diagram showing an embodiment (1) of a detection circuit in a temperature sensor according to the present invention.

FIG. 3 shows an embodiment (1) of the detection circuit 30, which is composed of a counter (temperature counter) 31 for inputting the frequency f2 from the oscillator circuit 20_2, a centesimal counter (reference counter) 32 for inputting the reference frequency signal f1 from the oscillator circuit 20_1 and for outputting a counter value and a reset signal 91, a determiner 33 for inputting the counter value and for outputting a latch signal 92 when the counter value assumes "99", a register 41 for temporarily storing the value of the counter 31, and a subtractor 34 for outputting the temperature signal 90 obtained by subtracting "100" from the value of the register 41.

In operation, the centesimal counter 32 repeats the operation of counting the signal f1 between 0-99 in order to count a predetermined time interval to output its carry signal as the reset signal 91. The determiner 33 determines that the value of the counter 32 is "99", and then outputs the latch signal 92.

It is to be noted that since the frequency of the signal f1 depends on a temperature, the predetermined time interval is not always the same time interval.

The counter 31 counts the signal f2 after the counter is reset to "0" with the reset signal 91 until the following reset signal 91 is inputted. The register 41 stores the counter value of the counter 31 with the latch signal 92. The subtractor 34 subtracts "100" from this counter value to be outputted as the temperature signal 90.

It is to be noted that the frequency signals f1 and f2 are assumed to be pulse signal signals. However, even if the outputs of the oscillator circuits 20_1 and 20_2 are signals of another form, they can be inputted to the above-mentioned detection circuit 30 unchanged or by shaping them into pulse signals.

Figure 4:
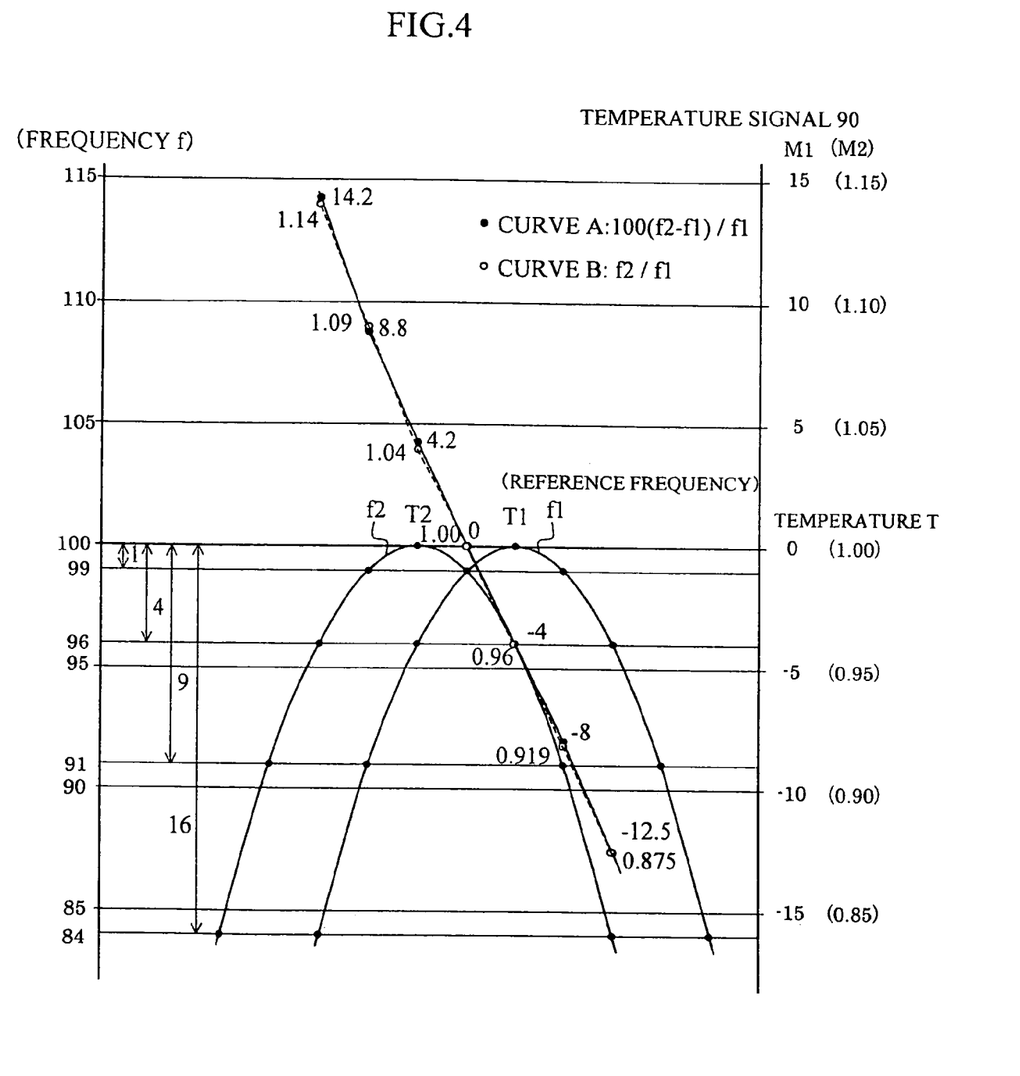
FIG. 4 is a graph showing frequency-temperature characteristics of two SAW resonators used in a temperature sensor according to the present invention, and a frequency-temperature signal characteristic example obtained by synthesizing the frequency-temperature characteristics.

FIG. 4 shows a relationship between the above-mentioned frequency signals f1 and f2 and the output temperature signal 90. Data values in FIG. 4 are calculated values shown for reference in order to simplify understanding the operation.

Also, the frequency-temperature characteristics of two resonators are shown to exhibit characteristics of the same quadratic coefficient and their peak temperatures respectively assume temperatures T1 and T2 different from each other at the frequency="100".

In FIG. 3, the time interval when the centesimal counter 32 counts "0"-"99" is 100/f1. During this time interval, the value counted by the counter 31, that is the counter value stored in the register 41 is f2 (100/f1). The value of the temperature signal 90 which is the output of the subtractor 34 where 100 (=the value corresponding to the centesimal of the centesimal counter 32) is subtracted from the counter value f2 (100/f1) assumes f2(100/f1)−100=100(f2−f1)/f1.

A curve A of FIG. 4 shows a relationship between the above-mentioned calculated value and the temperature signal 90 (=100(f2−f1)/f1: indicated by calibrations M1 of ordinate on the right of FIG. 4). This curve A is almost a straight line. It is to be noted that a curve B will be described later.

In this example, a calculation corresponding to a calculating circuit which calculates the difference between the both counters 31 and 32 described in the present invention (2) in Summary of the Invention is realized by the centesimal counter 32 and the subtractor 34. Namely, the centesimal counter 32 is made a reference counter and a subtraction value of the subtractor 34 is made "100", thereby subtracting the signal f1 from the signal f2.

Thus, without using an accurate absolute frequency reference such as a reference frequency oscillator circuit 40 shown in FIG. 18, the temperature signal 90 having another temperature characteristic can be obtained from resonators having different frequency-temperature characteristics. It is to be noted that in order to accurately make the temperature signal 90 coincide with a desired temperature characteristic further for correcting the temperature characteristic of a VCTCXO device described later, for example, the correction has only to be performed by using a method described later.

Also, it is needless to say that if a resonator having another frequency-temperature characteristic is used, a temperature sensor 10 having a temperature characteristic different from that of the curve A can be arranged.

Figure 5:
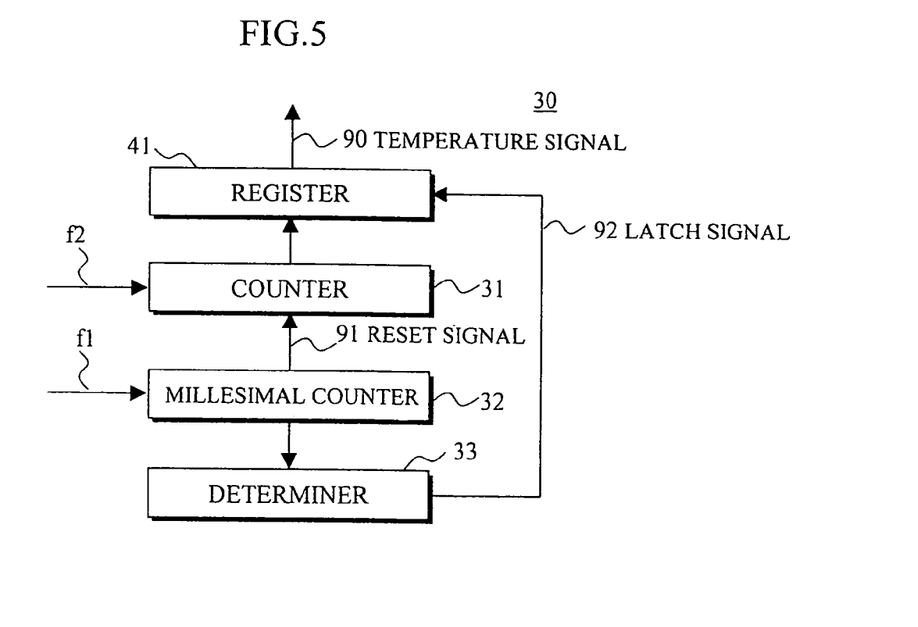
FIG. 5 is a block diagram showing an embodiment (2) of a detection circuit in a temperature sensor according to the present invention.

FIG. 5 shows an embodiment (2) of the detection circuit 30. This embodiment is different from the embodiment (1) of FIG. 3 in the following points: The centesimal counter 32 is substituted for a millesimal counter (reference counter) 32, no subtractor 34 is provided, and the output of the register 41 storing the counter value of the counter (temperature counter) 31 is made a temperature signal 90.

In operation, the millesimal counter 32 inputs the signal f1 and repeats the count between "0"-"999" in order to set a predetermined time interval. When the counter value changes from "999" to "0", the reset signal 91 is outputted to reset the counter 31 to "0". Namely, the reset signal 91 is outputted at time intervals of 1000/f1 to repeat the reset of the counter 31.

The counter 31 counts the pulse number of the signal f2 between the reset signal 91 and the following reset signal 91.

The determiner 33 determines that the counter value of the millesimal counter 32 assumes "999" to provide the latch signal 92 to the register 41.

Accordingly, the timing of outputting the latch signal 92 is when the counter value of the counter 31 assumes a maximum before the reset signal 91. The counter value at this time is (1000/f1)f2=1000f2/f1. The value in which the decimal point of the temperature signal 90 outputted from the register 41 is moved by three digits toward the upper digit assumes f2/f1. Thus, by the calculating circuit composing the detection circuit 30, the ratio between the temperature counter 31 and the reference counter 33 is calculated.

The above-mentioned curve B in FIG. 4 shows a relationship between the temperature T (abscissa) and the temperature signal 90 (=f2/f1: calibrations M2 of ordinate within parentheses on the right of FIG. 4). In this example, the curve B is also nearly a straight line, but is different from the curve A.

It is to be noted that in FIG. 4 the curves A and B appear to be almost the same curves. This is because both curves are plotted by calibrations different from each other, so that the values of the temperature signal 90 on both curves are different for the same temperature T. For example, at the same temperature T2, the temperature signal 90 is synthesized with the difference=4.2, and the temperature signal 90 is synthesized with the ratio=1.04.

Thus, in the same way as the embodiment (1), an accurate absolute reference frequency is not required. Also, when resonators having the same frequency-temperature characteristics as the embodiment (1) are used, a temperature sensor of a different temperature characteristic can be arranged since the calculation is different in terms of difference and ratio of the counter values.

Figure 6:
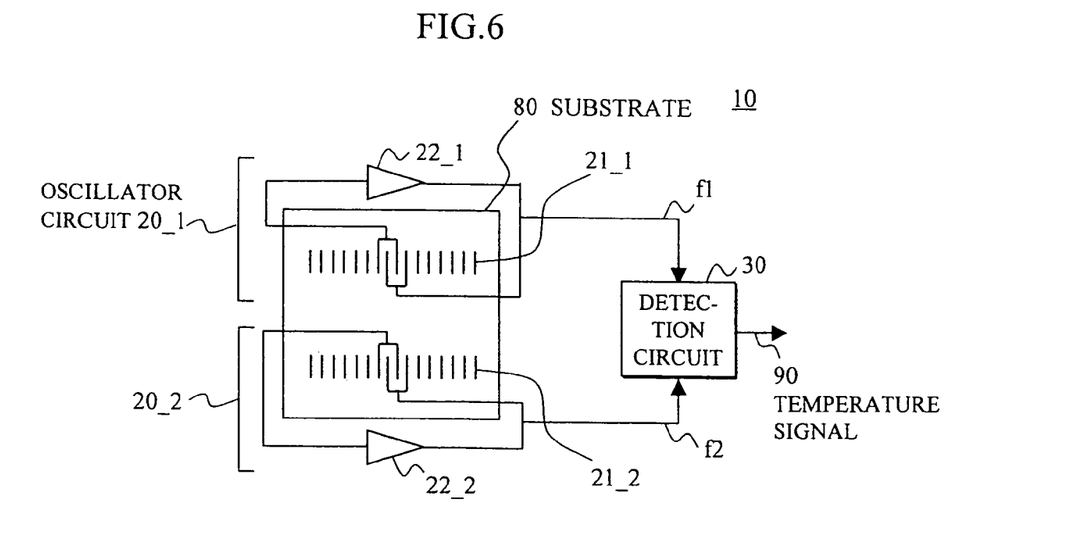
FIG. 6 is a block diagram showing an embodiment (2) of a temperature sensor according to the present invention.

FIG. 6 shows an embodiment (2) of the temperature sensor 10 according to the present invention. This example is different from the embodiment (1) of FIG. 2 in that the SAW resonators 21_1 and 21_2 are provided on the same substrate 80.

Thus, the SAW resonators 21_1 and 21_2 in their entirety can be downsized. Also, in comparison with the case where the resonators are discrete, the temperature sensing positions are close and the temperature characteristics are the same, so that the accuracy is improved.

Figure 7:
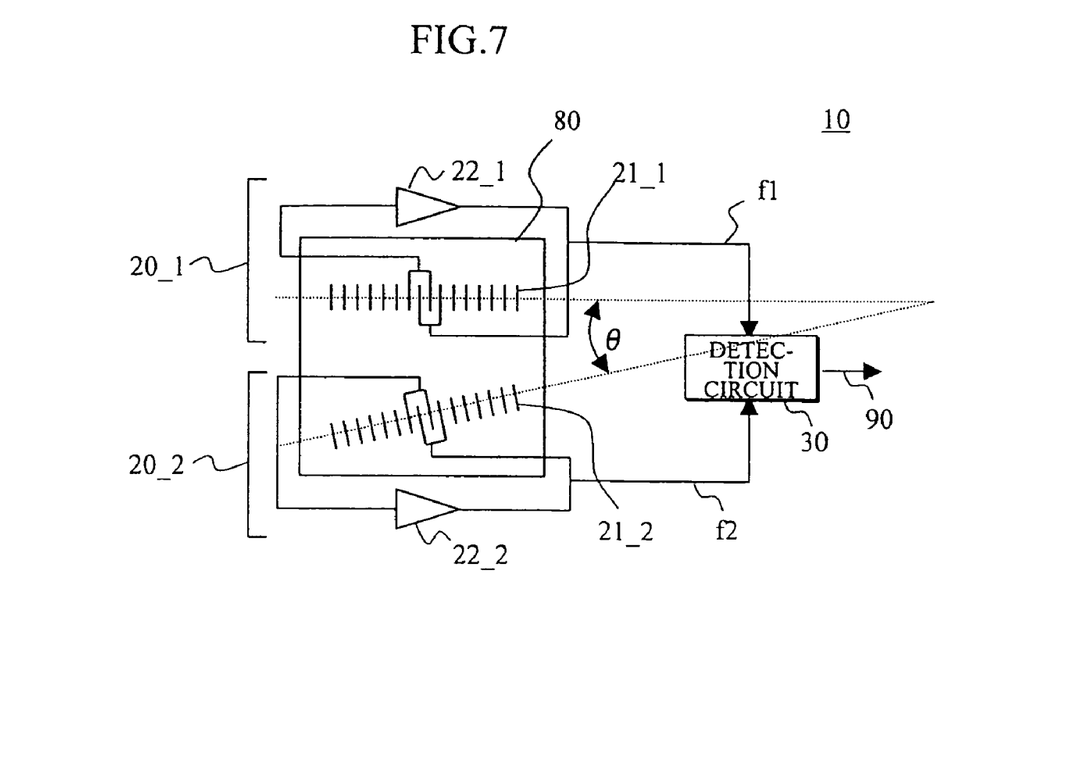
FIG. 7 is a block diagram showing an embodiment (3) of a temperature sensor according to the present invention.

FIG. 7 shows an embodiment (3) of the temperature sensor 10 according to the prevent invention. This example is different from the embodiment (2) of FIG. 6 in that the directions of the two SAW resonators 21_1 and 21_2 provided on the same substrate 80 are respectively angled by θ on the surface of the substrate 80.

In the embodiment (2), because of the same substrate 80, that is, the same cut angle, the number of design parameters for making only peak temperatures different is decreased by one in comparison with the case where the SAW resonators 21 are discrete.

Therefore, in order to make only the peak temperatures different, an electrode pitch and a coating thickness have to be made different. As a result, a frequency adjustment of the SAW resonators 21_1 and 21_2 has to be independently performed.

Therefore, according to the embodiment (3), it becomes possible to equate an electrode coating thickness by using a parameter of a rotation on the surface of the substrate, and to simplify a manufacturing process.

Figure 8:
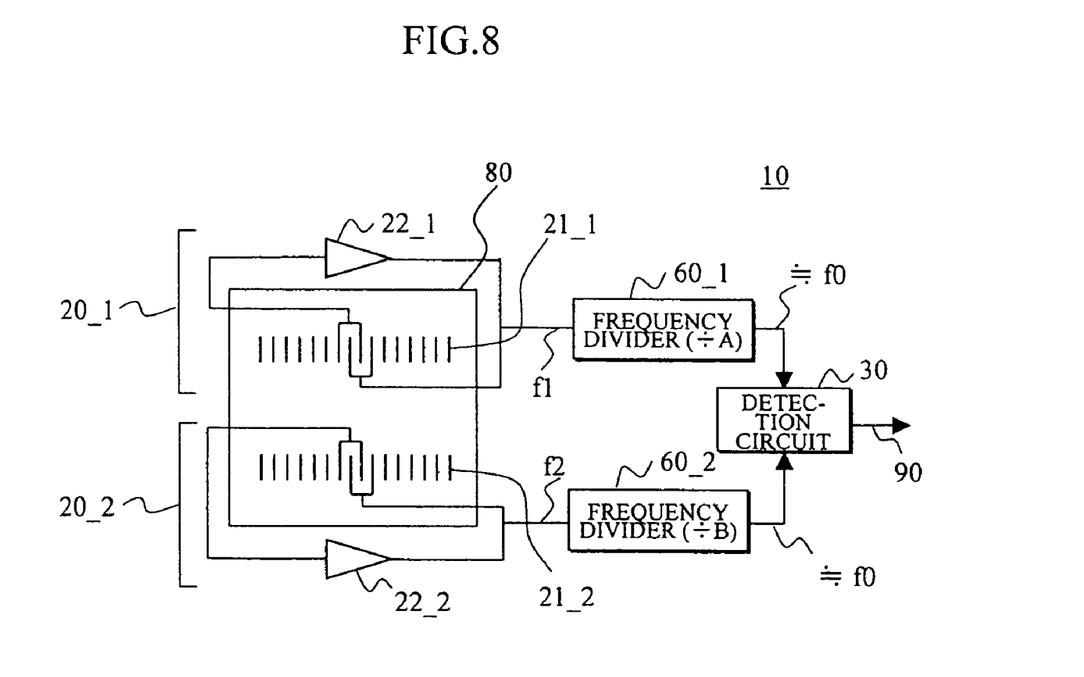
FIG. 8 is a block diagram showing an embodiment (4) of a temperature sensor according to the present invention.

FIG. 8 shows an embodiment (4) of a temperature sensor 10 according to the present invention. This embodiment is different from the embodiment (2) of FIG. 6 in that frequency dividers 60_1 and 60_2 (occasionally represented by a reference numeral 60) are respectively inserted between the oscillator circuits 20_1, 20_2 and the detection circuit 30.

Namely, it becomes possible to change the frequency-temperature characteristic of the oscillator circuit as observed from the side of the detection circuit. Thus, by introducing a parameter which makes frequencies of the two SAW resonators different, it becomes possible to increase a flexibility of a design.

For example, the frequency dividers 60_1 and 60_2 can respectively divide the frequency signals f1 and f2 into frequencies which are almost the same as the frequency f0 but are different from each other. Thus, it is possible to generate beats at two frequencies.

It is to be noted that either one or both of the frequency dividers 60_1 and 60_2 may be a frequency multiplier. Also, one of the frequency dividers 60 or the frequency multipliers may be omitted.

Also, the SAW resonators may be arranged by discrete resonators.

Figure 9:
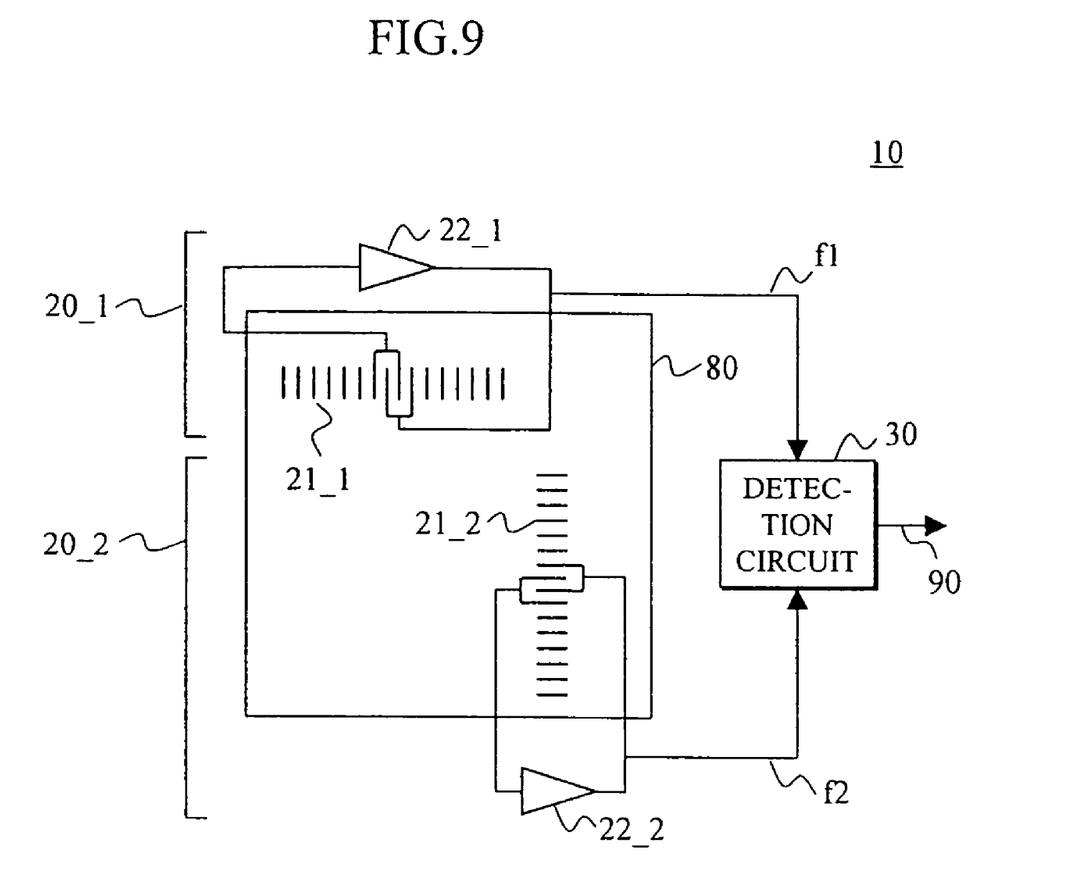
FIG. 9 is a block diagram showing an embodiment (5) of a temperature sensor according to the present invention.

FIG. 9 shows an embodiment (5) of the temperature sensor 10 according to the present invention. This example is different from the embodiment (2) shown in FIG. 6 in that one of the SAW resonators 21 uses a Rayleigh wave, and the other SAW resonator 21 uses an SH wave.

In this embodiment, since an available mode is different, it is difficult to obtain temperature characteristics in which only the peak temperatures of the SAW resonators 21_1 and 21_2 are different from each other. Conversely, it becomes possible to obtain various temperature characteristics, and to use the temperature characteristics for a temperature correction of a device which is not linear.

Figure 10:
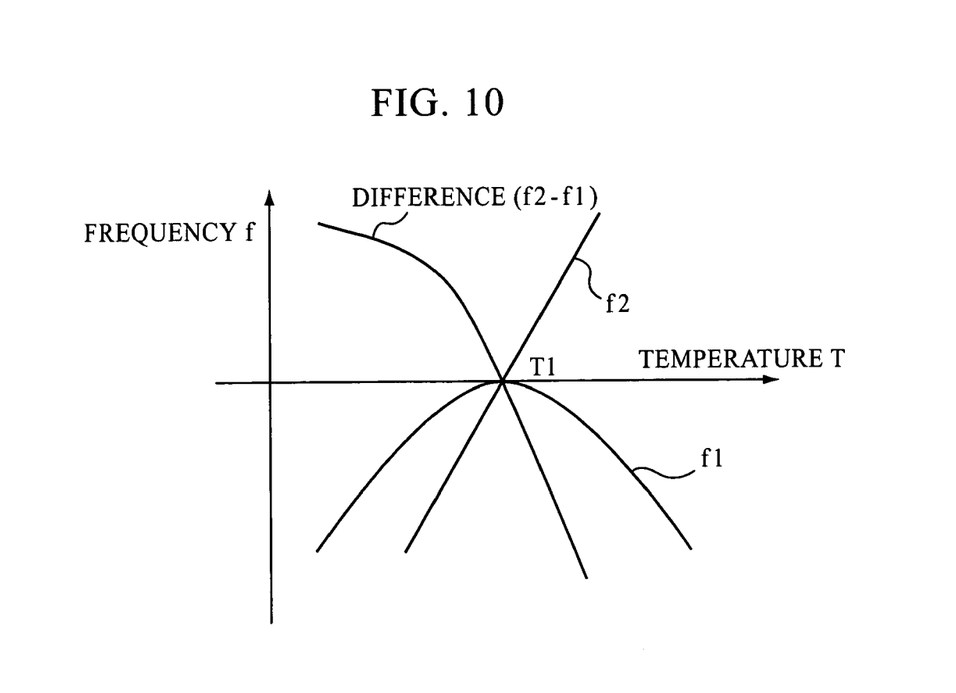
FIG. 10 is a graph showing frequency-temperature characteristics of two SAW resonators used in a temperature sensor according to the present invention and a characteristic example (1) of a difference therebetween.
Figure 11:
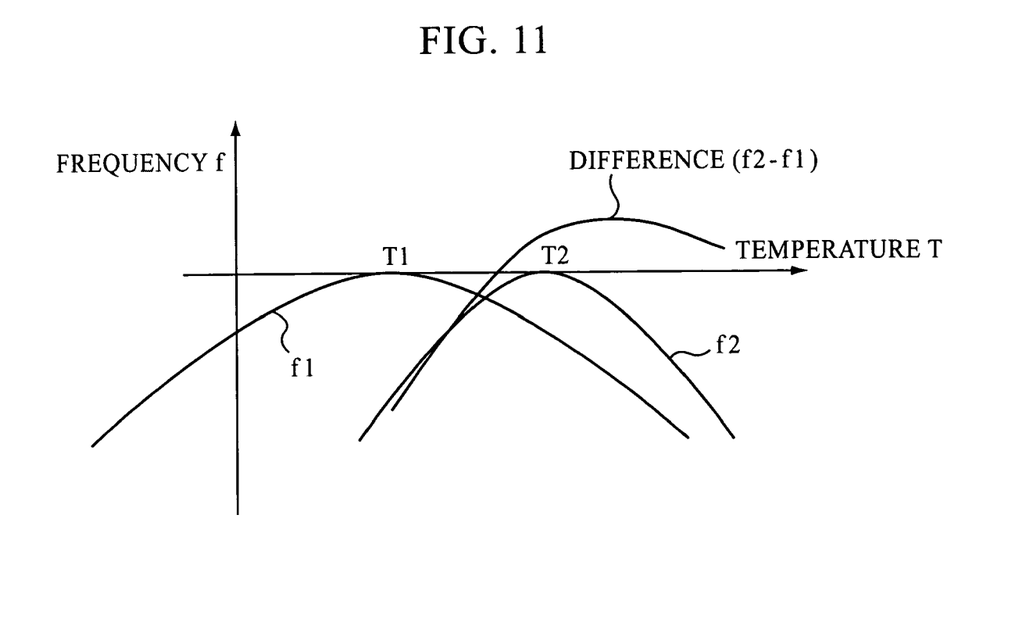
FIG. 11 is a graph showing frequency-temperature characteristics of two SAW resonators used in a temperature sensor according to the present invention and a characteristic example (2) of a difference therebetween.

FIGS. 10 and 11 show characteristics of the Rayleigh wave signal f1 and the SH wave signal f2.

Depending on a selection of a cut angle of a substrate, i.e. which mode should be the object, e.g. the temperature characteristic of the difference (f2−f1) differs greatly.

FIG. 10 shows a case where a cut angle (around ST38°) for the Rayleigh wave is selected, and a linear characteristic remarkably appears in the SH wave signal f2.

Reversely, FIG. 11 shows a case where a cut angle (around ST36°) for the SH wave is selected. Both of the Rayleigh wave signals f1 and the SH wave signal f2 are almost a quadratic characteristic, but their coefficients are generally different from each other (it is possible to make the coefficients the same).

It is to be noted that the SAW resonators can be arranged in discrete form.

Figure 12:
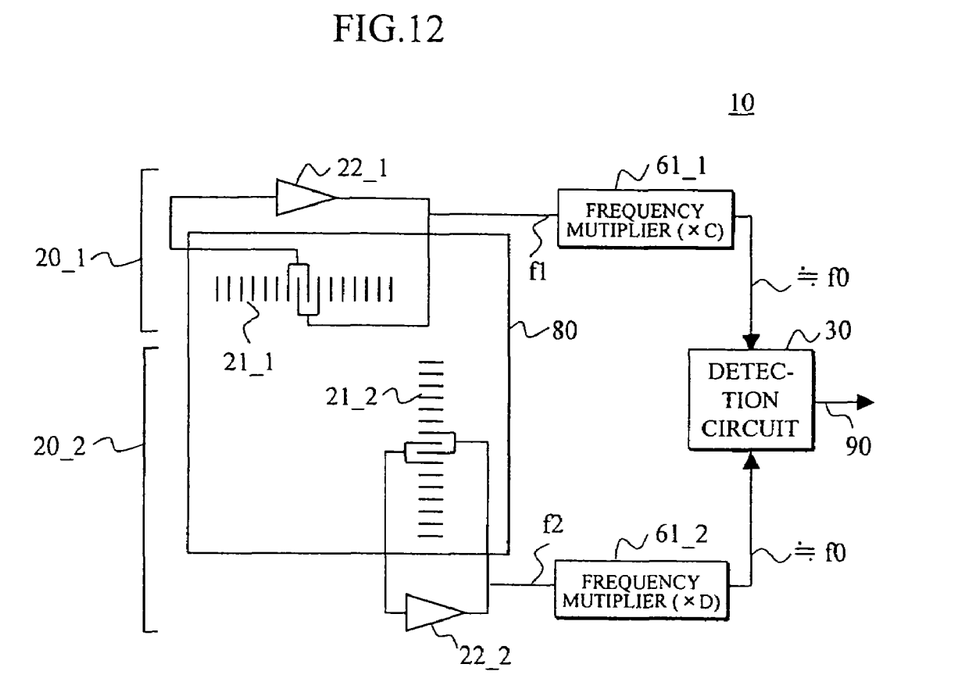
FIG. 12 is a block diagram showing an embodiment (6) of a temperature sensor according to the present invention.

FIG. 12 shows an embodiment (6) of the temperature sensor according to the present invention. This embodiment is different from the embodiment (5) in that frequency multipliers 61_1 and 61_2 (occasionally represented by a reference numeral 61) are respectively connected in series between the oscillator circuit 20_1 and the detection circuit 30, and the oscillator circuit 20_2 and the detection circuit 30.

Thus, in the same way as the embodiment (4), it becomes possible to increase a flexibility of a design.

It is to be noted that either one or both of the frequency multipliers 61 may be a frequency divider. Also, one of the frequency divider 60 or the frequency multiplier 61 may be omitted.

Figure 13:
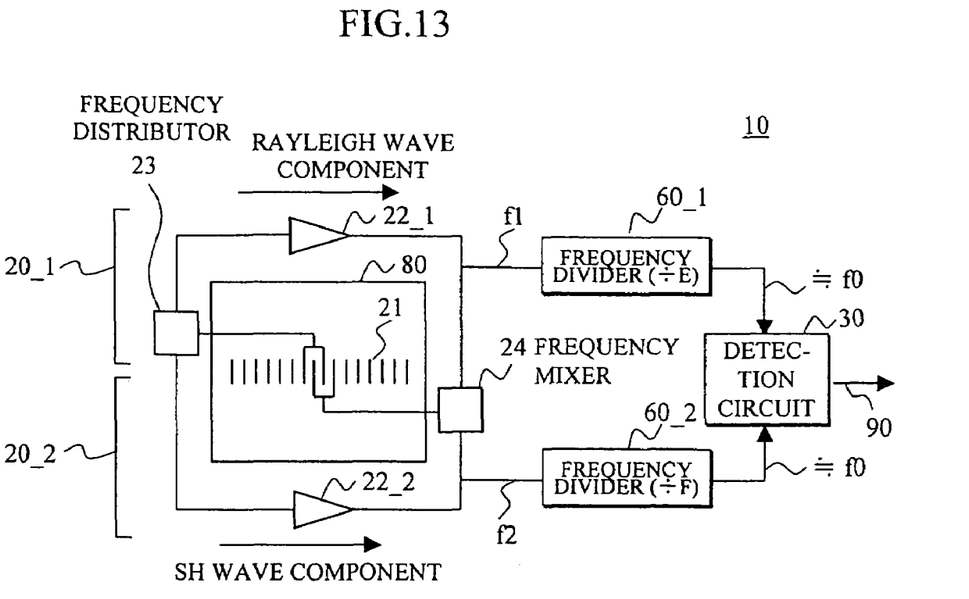
FIG. 13 is a block diagram showing an embodiment (7) of a temperature sensor according to the present invention.

FIG. 13 shows an embodiment (7) of the temperature sensor 10 according to the present invention. This example is different from the embodiment (4) shown in FIG. 8 in that a single SAW resonator 21 is provided, and the amplifiers 22_1 and 22_2 are connected to the SAW resonator 21 through a frequency distributor 23 and a frequency mixer 24.

In operation, the frequency distributor 23 distributes the Rayleigh wave of the SAW resonator 21 to the amplifier 22_1, and distributes the SH wave to the amplifier 22_2. The frequency mixer 24 mixes the Rayleigh wave from the amplifier 22_1 and the SH wave from the amplifier 22_2 to be provided to the SAW resonator 21.

The oscillator circuits 20_1 and 20_2 respectively oscillate at the frequencies of the Rayleigh wave and the SH wave. Thus, it becomes possible to provide only a single SAW resonator 21, thereby enabling the downsizing and high accuracy to be expected.

Figure 14:
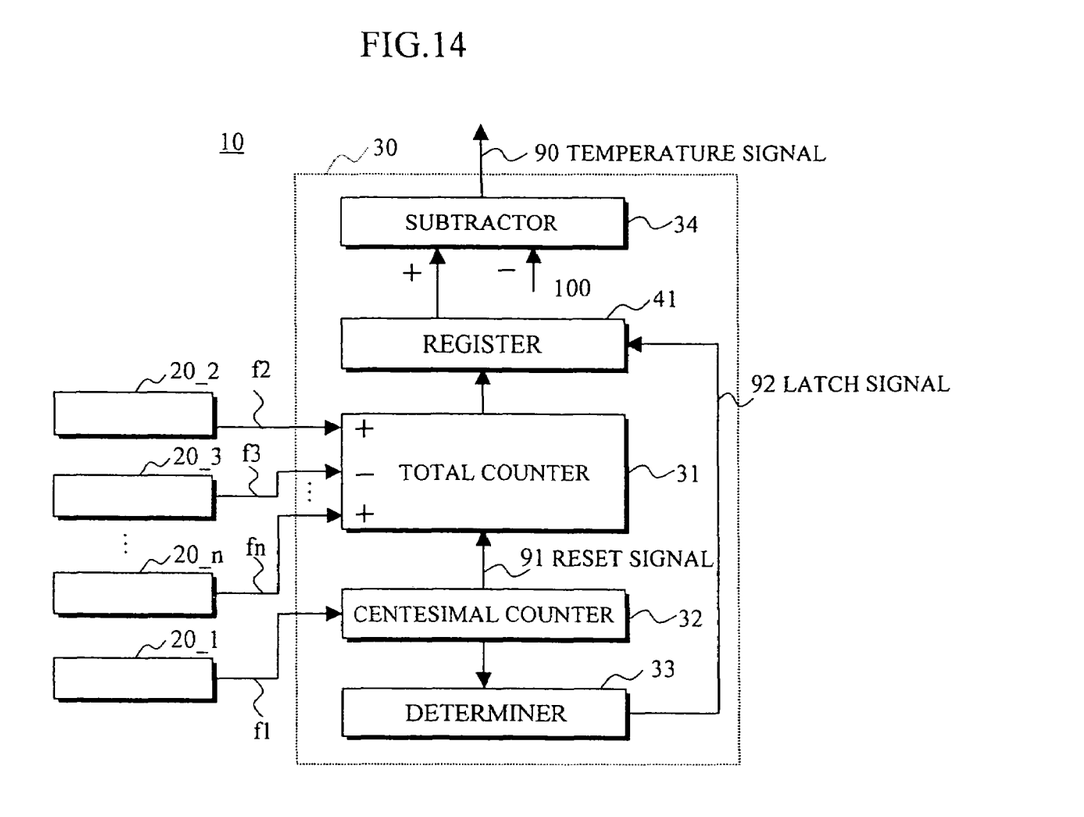
FIG. 14 is a block diagram showing an embodiment (8) of a temperature sensor according to the present invention.

FIG. 14 shows an embodiment (8) of the temperature sensor according to the present invention. This embodiment is different from the embodiment (1) of FIG. 2 in that the oscillator circuits 20_1-20_n, respectively oscillating at the resonators 22_1-22_n (not shown; "n" is a natural number equal to or more than three) having the frequency-temperature characteristics different from each other, provide the frequency signals f1-fn to the detection circuit 30.

Also, the detection circuit 30 is different from that of FIG. 3 in that the counter 31 is substituted for a total counter 31, and the frequency signals f2-fn are inputted to the counter 31.

The operations of the centesimal counter 32, the determiner 33, the register 41, and the subtractor 34 are the same as those in FIG. 3. The total counter 31 counts the inputted frequency signals f2-fn in an up direction or a down direction to output the totalized counter value. It is to be noted that positive and negative signs in the total counter 31 are shown as an example.

As a result, the counter value provided from the total counter 31 to the register 41 at the timing of the latch signal 92 assumes e.g. $100(f2-f3+ \ldots +fn)/f1$.

Accordingly, the temperature signal $90=(100(f2-f3+ \ldots +fn)/f1)-100=100(f2-f1-f3+ \ldots +fn)/f1$ is outputted from the subtractor 34.

The value of the temperature signal 90 is different from that of FIG. 3 in that $(-f3+ \ldots +fn)$ term is added in the parentheses of the numerator. The value of this term can be changed together with the frequency-temperature characteristics of the resonators 22_3-22_n or a count direction.

Thus, it is possible to correct the curve A shown in FIG. 4 to a complete straight line by further adding one or more oscillator circuits 20 to provide three or more oscillator circuits.

It is to be noted that the following circuit arrangement can be considered for another method of measuring remaining frequencies with a single frequency being made a reference frequency.

Namely, counters C1-Cn (not shown) for respectively counting the frequency signals f1-fn and a counter C0 (not shown) for counting the frequency signal f0 are provided. It is supposed that the counter C1 corresponds to the above-mentioned reference counter. Also, the counter C0 is newly provided, and the accuracy of the temperature characteristic of the frequency signal f0 is not cared.

The counter C0 counts a fixed time interval, so that the counters C1-Cn respectively count the frequency signals f1-fn at the fixed time intervals and obtain the maximum counter value of the counters C1-Cn. The respective ratios between the counter C1 and the remaining counters C2-Cn are obtained. Namely, the other frequency signals f2-fn are supposed to be obtained with the frequency signal f1 being made a reference frequency. By synthesizing the ratios, a predetermined temperature characteristic can be obtained.

Also, for another method of measuring the remaining frequencies with a single frequency being made a reference frequency, it is possible to measure a time for a single wavelength of the frequencies f1-fn respectively with the high frequency f0 (accuracy of the frequency f0 to the temperature is not cared), and to obtain the frequencies f1-fn with e.g. a time for a single wavelength of the frequency f1 being made a reference. Thus, a temperature sensor having a fast response speed can be arranged.

Figure 15:
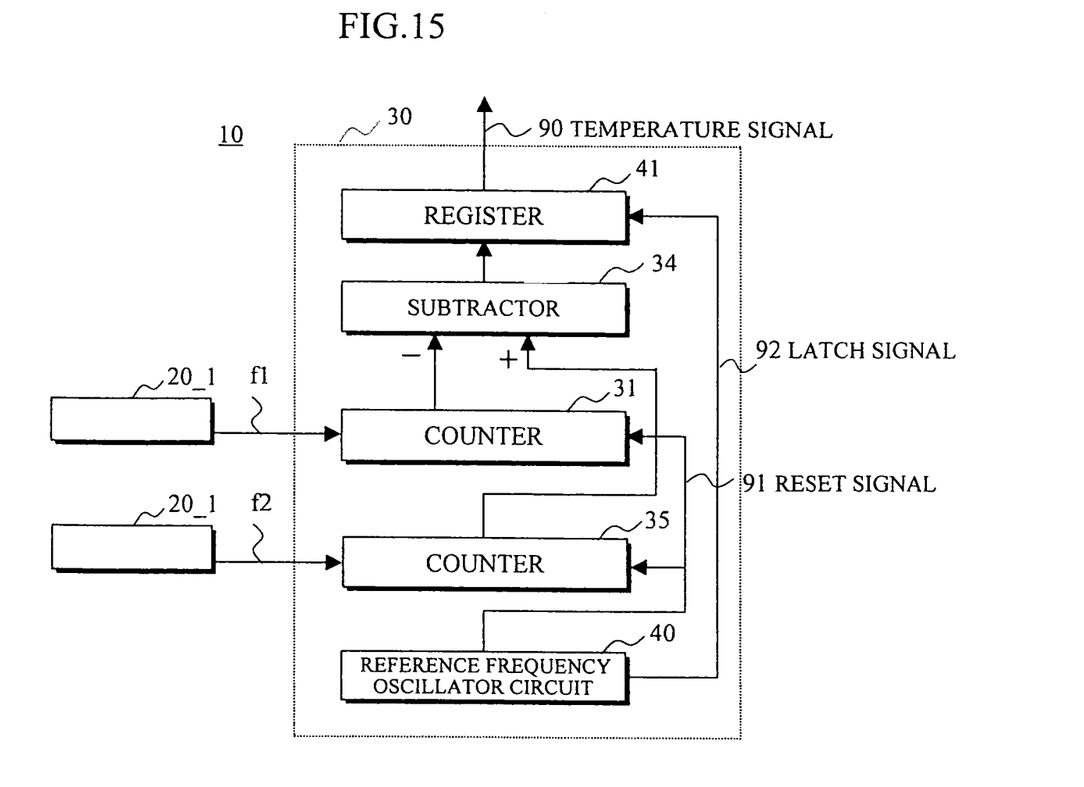
FIG. 15 is a block diagram showing an embodiment (9) of a temperature sensor according to the present invention.

FIG. 15 shows an embodiment (9) of the temperature sensor 10 according to the present invention. The arrangement of this embodiment is the same as that of the embodiment (1) shown in FIG. 2, so that the frequency signals f1 and f2 of the oscillator circuits 20_1 and 20_2 are provided to the detection circuit 30.

However, the arrangement of the detection circuit 30 is basically different from that of the detection circuit 30 shown in FIG. 3. For example, the detection circuit 30 is not arranged such that the other frequency signal f2 is measured with one frequency signal f1 being made a reference.

Namely, the detection circuit 30 is composed of the counter 31 for inputting the signal f1, the counter 35 for inputting the signal f2, the reference frequency oscillator circuit 40 for providing the reset signal 91 to the counters 31 and 35 and for outputting the latch signal 92, the subtractor 34 for inputting the counter values of the counters 31 and 35 and for outputting the difference between the counter values, and the register 41 for inputting the calculation result of the subtractor 34 and the latch signal 92 and for outputting the temperature signal 90.

Also, the frequency-temperature characteristics of the respective SAW resonators 21_1 and 21_2 (not shown) in the oscillator circuits 20_1 and 20_2 are supposed to have a quadratic characteristic as shown in FIG. 1 where quadratic coefficients are the same, linear coefficients are different, and the peak frequencies are equal.

It is to be noted that the peak frequencies are not necessarily equal. In this embodiment, for a contrast with the frequency-temperature characteristic of FIG. 4, the peak frequencies are supposed to be equal.

In operation, the oscillator circuit 40 outputs the latch signal 92, so that the register 41 stores the subtraction result of the subtractor 34 with the latch signal 92. The oscillator circuit 40 outputs the reset signal 91 at the timing of completing the storing operation. Namely, the oscillator circuit 40 repeatedly outputs the latch signal 92 and the reset signal 91 at the fixed intervals.

As a result, the value obtained by subtracting the maximum counter value of the counter 31 from the maximum counter value of the counter 35 at the subtractor 34 is stored in the register 41, so that the value is outputted as the temperature signal 90.

Thus, as shown in the present invention (7) in Summary of the Invention, the relationship between the temperature signal 90 and the actual temperature corresponding thereto becomes linear. Since this embodiment uses the reference frequency oscillator circuit 40, there is a possibility that the relationship of the linear line changes with the temperature characteristic of the circuit 40. However, it is possible to make a correction by the circuit arrangement where the above-mentioned embodiments (1)-(8) are combined.

Also, it becomes possible to compose the temperature sensor 10, having a linear characteristic not requiring a correction of the temperature by an ROM or the like, with a wide measurable temperature range and high accuracy.

It is to be noted that as a method of detecting the difference between the frequency of one oscillator circuit and that of the other oscillator circuit, and obtaining the difference, a method of taking out a beat signal by using a frequency converter which mixes and detects two oscillation frequencies is also possible.

Thus, if the resonators used for the oscillator circuits have the above-mentioned characteristic, the characteristic of the linear line can be obtained. However, in this case, a symmetrical line characteristic with respect to a measured value "0" is obtained, so that whether the temperature signal is on the positive side or the negative side can not be determined as it is.

Therefore, the circuit is prepared for simply obtaining the relationship as to which one of e.g. two frequency signals f1 and f2 is larger, and whether the signal is either on the positive/negative side has only to be determined based on the above relationship.

It is to be noted that while the temperature signal 90 from the above-mentioned detection circuit is outputted as a digital signal, it can be outputted as an analog signal.

Figure 16:
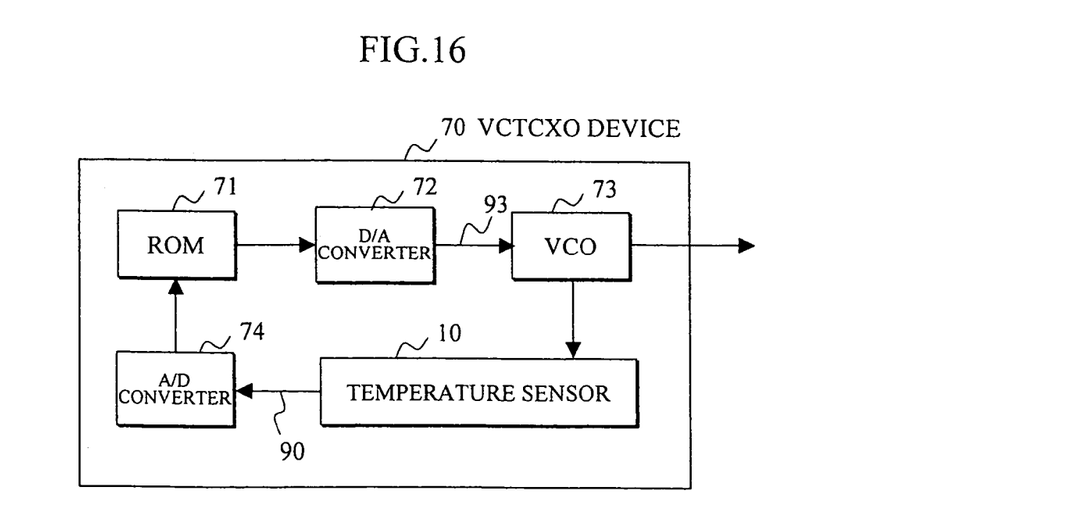
FIG. 16 is a block diagram showing an embodiment of a VCTCXO device using a temperature sensor according to the present invention.

FIG. 16 shows an embodiment of a VCTCXO device 70 to which the temperature sensor 10 according to the present invention is applied.

This device is composed of a voltage control oscillator (VCO) 73, a temperature sensor 10 for detecting the temperature of the VCO 73, an A/D converter 74 for AID converting the temperature signal 90 (analog signal) of the temperature sensor 10, a ROM 71 for outputting the digital signal converted by the AID converter 74 based on conversion data, and a D/A converter 72 for converting the digital signal from the ROM 71 into an analog control signal 93 and for providing the signal 93 to a control input terminal of the VCO 73.

Also, the conversion data for matching temperature correction information of the VCO 73 with the output characteristic of the temperature sensor 10 and for improving the temperature characteristic of the VCTCXO device 70 in its entirety are written in the ROM 71.

In operation, the temperature sensor 10 detects the temperature of the VCO 73 as the temperature signal 90. The A/D converter 74, the ROM 71, and the D/A converter 72 convert the temperature signal 90 into the control signal 93 to control the oscillation frequency of the VCO 73.

Thus, the frequency-temperature characteristic of the VCTCXO device 70 in its entirety is improved, so that the VCTCXO device 70 stable for the temperature is arranged.

Also, according to the temperature sensor 10 of the present invention, it is possible to design the temperature sensor 10 having a temperature characteristic of compensating the temperature characteristic of the VCO 73. If such a temperature sensor 10 is used, the A/D converter 74, the ROM 71, and the D/A converter 72 become unnecessary, so that it becomes possible to directly input the temperature signal 90 as the control signal 93 to the VCO 73 and to arrange the simple VCTCXO device 70.

As described above, a temperature sensor according to the present invention is arranged such that based on a frequency of one oscillator circuit (resonator), frequencies of the other one or more oscillator circuits (resonators) are measured, and frequency-temperature characteristics of a plurality of resonators are synthesized. Therefore, it becomes possible to obtain a predetermined temperature characteristic (relationship between an actual temperature and an output temperature signal of a temperature sensor) having a wide measurable range, without using an accurate reference frequency which does not depend on a temperature.

Also, two oscillator circuits have two resonators respectively with quadratic characteristics in which quadratic coefficients are the same and linear characteristics are different from each other, and a difference between oscillation frequencies of both oscillator circuits is obtained, thereby enabling an accurate temperature sensor to be arranged which has a linear characteristic and a wide oscillation measurable range, and which requires a frequency reference with a favorable temperature characteristic.

Furthermore, if the temperature sensor according to the present invention is adopted for a temperature sensor portion of a VCTCXO device, it becomes possible to easily compensate the temperature characteristic of the VCO included in the VCTCXO device.

What I claim is:

1. A temperature sensor comprising:
   two oscillator circuits each having a SAW resonator, one said SAW resonator utilizing a Rayleigh wave and the other said SAW resonator utilizing an SH wave such that said SAW resonators have different frequency-temperature characteristics; and
   a detection circuit for detecting a difference between a frequency of one oscillator circuit and a frequency of the other oscillator circuit and for detecting a temperature corresponding to the difference.

\* \* \* \* \*